Feb. 24, 1925.
G. J. OSTRANDER
1,527,211
COMBINED REAR LIGHT AND LICENSE PLATE HOLDER FOR AUTOMOBILES
Filed June 5, 1924      2 Sheets-Sheet 1
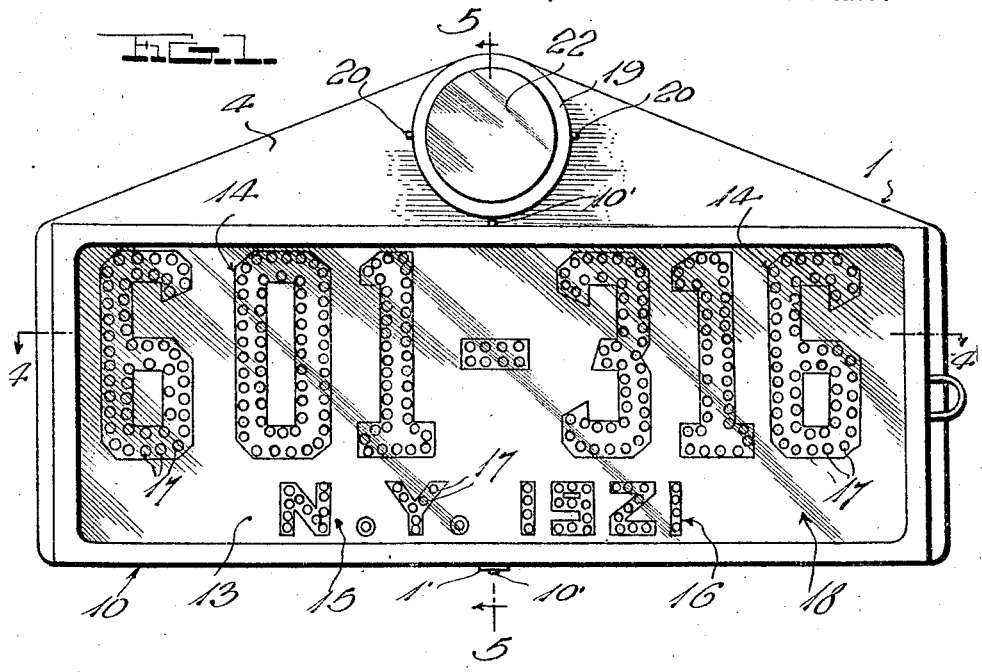
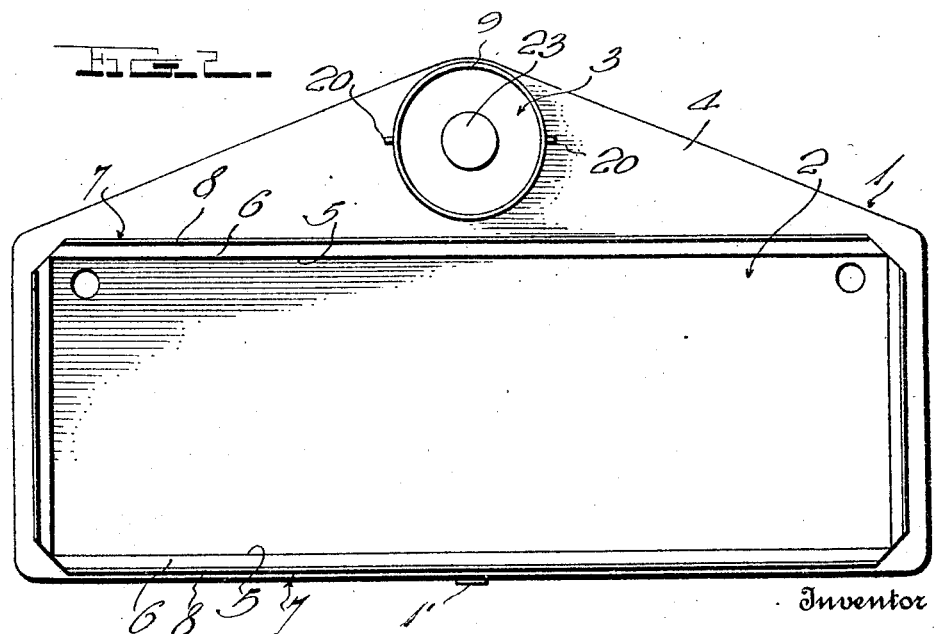
Witness
H. Woodard
Inventor
George J. Ostrander
By H. B. Wilson &co.
Attorneys Feb. 24. 1925.
G. J. OSTRANDER
1,527,211
COMBINED REAR LIGHT AND LICENSE PLATE HOLDER FOR AUTOMOBILES
Filed June 5, 1924    2 Sheets-Sheet 2
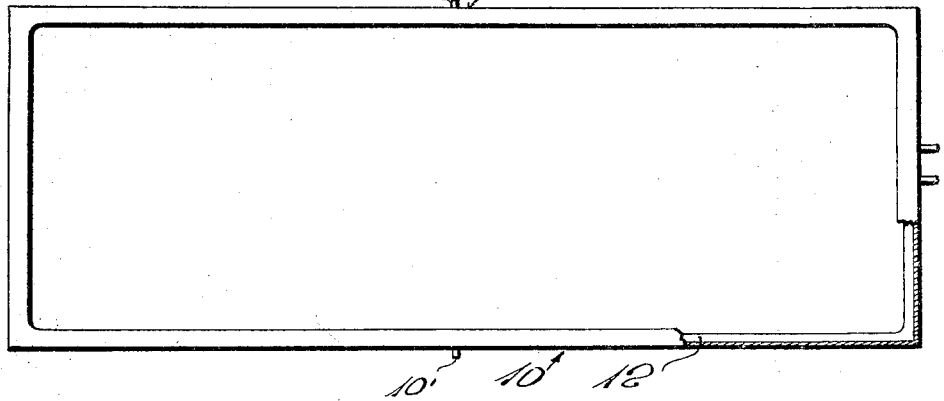
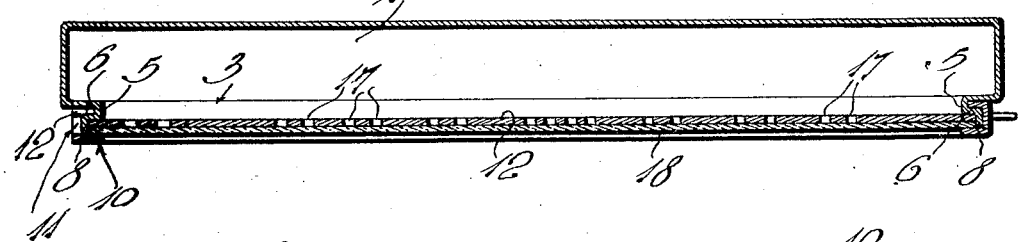
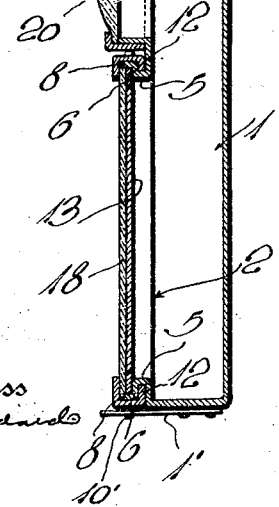
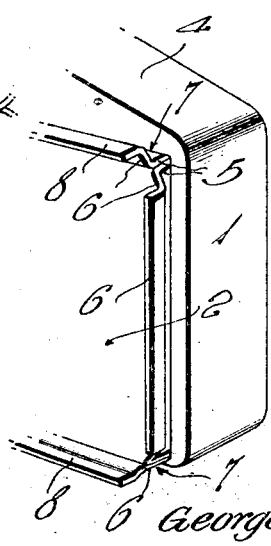
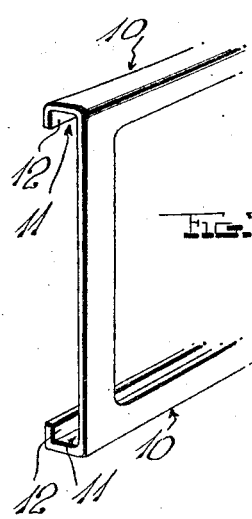
Inventor
George J. Ostrander
By H. R. Willson & Co.
Attorneys
Witness
H. Woodard Patented Feb. 24, 1925.

1,527,211

UNITED STATES PATENT OFFICE.

GEORGE JAMES OSTRANDER, OF ONEONTA, NEW YORK.

COMBINED REAR LIGHT AND LICENSE-PLATE HOLDER FOR AUTOMOBILES.

Application filed June 5, 1924. Serial No. 718,071.

*To all whom it may concern:*

Be it known that I, GEORGE JAMES OSTRANDER, a citizen of the United States, residing at Oneonta, in the county of Otsego and State of New York, have invented certain new and useful Improvements in Combined Rear Lights and License-Plate Holders for Automobiles; and I do declare the following to be a full, clear, and exact description of the invention, such as will enable others skilled in the art to which it appertains to make and use the same.

This invention, which relates to the art of illumination, is a combination rear light and license plate holder for automobiles, that is to say, a device embodying not only the tail light for an automobile but also means for holding the license plate in such a manner as to illuminate it to make it readily seen at night.

The invention contemplates the use of the ordinary license plate as issued by the State. This license plate is of course painted or enameled so as to display the license number, the abbreviation of the State and the year. As issued it is entirely opaque, but to adapt it to be used in connection with the present invention a series of small perforations are cut therein along the edges of the figures and letters constituting the license number, the abbreviation of the State and the year. This is done so that when the perforated plate is embodied in the device light will be allowed to pass through the perforations. In this way the figures and letters may be easily read at night.

The invention is extremely simple in construction and therefore can be easily made. Nevertheless, it is strong and durable and is of neat and attractive appearance. The novelty contained in the invention is the combination and arrangement of parts and the various features of construction which are hereinafter fully described and claimed. The following descriptive matter refers to the accompanying drawings which are to be considered as a part of this specification. In these drawings:—

Figure 1 is a front elevation of a device constructed in accordance with the principles of the invention.

Figure 2 is a view similar to Fig. 1 with the tail light lens omitted and also with the slide carrying the license plate omitted.

Figure 3 is a front view partly broken away and in section, of the aforesaid slide.

Figure 4 is a horizontal sectional view taken substantially on the plane indicated by the line 4—4 of Fig. 1.

Figure 5 is a vertical transverse sectional view taken substantially on a plane indicated by the line 5—5 of Fig. 1.

Figure 6 is a perspective view of one end of the casing with the slide removed; and Figure 7 is a similar view of one end of the slide.

In the accompanying drawings in which similar reference characters are used to designate like parts throughout the several views, the numeral 1 designates as a whole a hollow casing, one of the upright walls of which is provided with a relatively large horizontally disposed substantially rectangular opening 2. Above this opening 2 the same wall of the casing is provided with a substantially circular opening 3, the opening 3 being considerably smaller than the opening 2. In order to give the casing a neat and ornamental appearance, its top 4 thereof slopes downwardly from the opening 3 to the upper corners of the opening 2.

The upper, lower and vertical edges of the substantially rectangular opening 2 are bent outwardly as at 5, then laterally in opposite directions away from each other as at 6, and then again outwardly as at 8 to form a rectangular marginally-flanged outwardly-facing and externally-channeled seat overlying and slightly spaced from the portions of wall adjacent the edges of the opening 2. In this connection, it will be observed that the portions 6 of the seat are disposed in spaced relation from the portions of the wall adjacent the opening 2, forming the external channels 7. The corners of the seat which are thus formed along the edge of the opening 2, are cut away on oblique lines, as shown.

The substantially circular opening 3 of the casing is bent outwardly, that is flanged, to form an annular ring 9.

Slidably received in the guideways 7 which are arranged along the upper and lower edges of the opening 2, is an open substantially rectangular frame 10. The upper and lower edges of this frame 10 are formed into inwardly facing channels 11, the flanges 12 constituting the inner sides of these channels 11 being slidably received in the channels 7.

Fitted in the aforesaid seat composed of the outwardly facing shoulders formed by the portions 6 of the edges of the opening 2 and within the flanges 8 is a plate 13 having light transmitting portions. Since the invention has been designed as a combination rear light and license plate holder for automobiles, the plate 13 shown in the drawings is an automobile's license plate such as is issued by the State. It is therefore constructed of opaque material, having the license number 14 painted, enameled or lithographed thereon, and also bears the abbreviation of the State indicated by the numeral 15 and the year indicated by the numeral 16, depicted thereon in the same manner. To adapt this plate 13 for use in connection with the present invention perforations 17 are drilled or cut into the plate along the edges of the various figures and latters upon the plate. The plate is then fitted in the opening 2 of the casing in the manner hereinbefore described, and if desired a glass plate 18 may be placed either in front or back of the plate 13. This glass plate 18 fits the opening 2 the same as the plate 13. The corners of the plates 13 and 18 extend beyond the cut-off corners of the seat where they may be engaged by the finger and pulled out of the seat. The frame 10 is then slid in place so that the plates 13 and 18 will be retained in place over the substantially rectangular opening 2 of the casing.

In order to fasten the slide or frame 10 in place, the lower side of the casing 1 is provided with a resilient finger 1', the outer end of which extends across the lower side of the frame 10 and is provided with a perforation to receive a pin 10' extending from said side of said frame. As a matter of fact, each side of the frame 10 is provided with a pin 10' so that the frame may be locked when slid in place from either end. By depressing the finger 1' the frame may be unlocked to permit it to be removed, and being resilient it will snap into locking engagement with one of the pins 10' when the pin is opposite its perforation.

Co-operating with the flange or ring 9 arranged at the edge of the substantially circular opening 3, is another ring 19. This ring 19 fits the ring 9 as shown. One ring is provided with a pair of radially extending pins 20. The other ring is provided with a pair of bayonet slots 21 to receive the pins 20 whereby the two rings are detachably coupled together. The drawings illustrate the pins 20 as being carried by the ring 9, and the slots 21 as being formed in the ring 19. Mounted in the ring 19 is a lens or other suitable light transmitting member 22. Where the device is used as a tail light for automobiles the lens or light transmitting member 22 should be a red color, but the color can be changed according to the particular use to be made of the device. For instance if the device is to be placed on the front of an automobile the member 22 may be either clear or of green color.

The inside of the casing 1 is enameled, painted or otherwise given a white or light color, and mounted within the casing, preferably directly back of the circular opening 3, is an electric light bulb 23. The rays from this light pass through the lens or light transmitting member 22, but of course some of them, in fact a great many of them, are directed into the lower portion of the casing and pass through the perforations 17 arranged around the edges of the numbers and letters upon the license plate 13. In this way, although rays of light do not shine upon the outer surface of the license plate 13, yet the figures and letters upon the same are outlined by light in such a way that they may be readily distinguished at night.

From the foregoing description taken in connection with the accompanying drawings it will be seen that the device is of extremely simple construction and yet is strong and durable. The parts are fitted together in such a manner that they will not rattle, and no parts will easily work loose and become lost. Considerable emphasis is to be laid upon the fact that the device contemplates the use of the ordinary license plate issued by the State.

It is obvious that numerous changes in form, proportion, and in some of the details of construction may be resorted to without departing from the spirit and principle of the invention or sacrificing any of the advantages thereof, so that it is to be understood that such changes may be made within the meaning and scope of the appended claim.

I claim:

A device of the class described comprising a holllow casing having one wall provided with a four-sided opening, the material of said wall at the four edges of said opening being bent to form a four-sided marginally-flanged and externally-channeled seat overlying and slightly spaced from the portions of said wall adjacent the edges of said opening, said material being cut away on oblique lines at the corners of said seat, an apertured automobile license plate fitted in said seat and retained against longitudinal and lateral shifting by the maginal flanges thereof, the corners of said plate extending beyond the cut-off corners of said seat where they may be engaged by the finger to pull said plate out of said seat, an open four-sided frame having portions fitted over said seat and the edges of said plate and retaining the latter in said seat, said frame being provided along two opposite edges with internal channels fitting in the aforesaid external channels of said seat and providing a sliding connection of said frame to said casing, means for locking said frame against sliding when in place, and a light mounted in said casing.

In testimony whereof I have hereunto affixed my signature.

GEORGE JAMES OSTRANDER.